United States Patent [19]
Bücker

[11] Patent Number: 6,070,553
[45] Date of Patent: Jun. 6, 2000

[54] VALVE FOR A MILK PIPELINE

[75] Inventor: Heinrich Bücker, Langenberg, Germany

[73] Assignee: Westfalia Landtechnik GmbH, Oelde, Germany

[21] Appl. No.: 09/275,529

[22] Filed: Mar. 24, 1999

[30] Foreign Application Priority Data

Mar. 24, 1998 [DE] Germany .......................... 198 12 968

[51] Int. Cl.⁷ .................................. A01J 5/00; F16K 7/07
[52] U.S. Cl. .............................................. 119/14.01; 251/5
[58] Field of Search ............................ 119/14.01, 14.02, 119/14.31, 14.32, 14.55; 251/5, 61.1

[56] References Cited

U.S. PATENT DOCUMENTS

| | | | |
|---|---|---|---|
| 2,982,511 | 5/1961 | Connor | 251/5 |
| 4,195,810 | 4/1980 | Lavin | 251/5 |
| 4,310,140 | 1/1982 | Boomer et al. | |
| 5,441,231 | 8/1995 | Payne et al. | 251/5 |

FOREIGN PATENT DOCUMENTS

| | | | |
|---|---|---|---|
| 0 075 255 | 3/1983 | European Pat. Off. | |
| 1416992 | 12/1964 | France | 251/5 |
| 131 775 | 7/1978 | Germany | |
| 26 58 361 | 8/1984 | Germany | |

*Primary Examiner*—Thomas Price
*Attorney, Agent, or Firm*—Alston & Bird LLP

[57] ABSTRACT

A valve for a milk pipeline which includes an elastic, tubular sealing unit mounted between two connectors in the milk pipeline, and a housing surrounding the sealing unit so as to define a closed chamber therebetween. The sealing unit can be brought by an external over-pressure in the chamber into a fully collapsed and closed position. Also, the valve is provided with a structure which engages at least one section of the sealing unit and applies a force directed substantially radially outwardly, so that the sealing unit is at least partly collapsed in its non-actuated state. As a result, the valve can be reliably closed with a small external over-pressure in the chamber.

13 Claims, 3 Drawing Sheets

VALVE FOR A MILK PIPELINE

BACKGROUND OF THE INVENTION

The present invention relates to a milking apparatus, and more particularly to a valve for controlling the flow of milk through a milk pipeline leading from a milking machine to a teat coupling.

In order to shut off a pipeline carrying milk in a milking installation, a valve is used which is provided with an elastic, hose-shaped sealing unit, which can be connected to the milk pipeline, optionally by means of pipe connectors. The sealing unit is arranged in a housing, forming a chamber lying between the sealing unit and the housing. The housing is provided with a connection for a working medium, wherein the connection opens out into the chamber.

A valve of this type is known, for example, from DE 26 58 361 C2 and DD-PS 131 775. The elastic, hose-shaped sealing unit can be brought into a sealing position by means of external over-pressure. The over-pressure is obtained by connecting the chamber to the ambient atmosphere while in the sealing unit the low-pressure of the milk pipeline acts such that the sealing unit is compressed. The sealing security of such a valve is substantially dependent upon the amount of the over-pressure which is produced by a pressure differential between the pressure present in the sealing unit and the ambient pressure, and upon the sealing unit being capable of being deformed.

With the known embodiments, a sufficiently high pressure differential is necessary for secure and reliable sealing of the valve. A high pressure differential such as this can be obtained in that the chamber is exposed to a pressure exceeding normal atmospheric pressure. The installation of a pressure system is necessary for this, whereby expenditure for the installation increases significantly.

The use of a valve is particularly problematic, as described, for example, in DE 26 58 361 C2, when it is used to shut off a long milk hose on a teat cluster. The teat cluster is in contact with the ambient atmosphere after removal from a teat of a cow, so that a very slight low pressure is created by means of atmospheric air flowing in, which is not necessarily sufficient to seal the valve securely.

Furthermore, with such usage, the situation arises where only the outlet side of the valve is under low pressure, wherein the inlet side of the valve and consequently also a part of the sealing unit is at atmospheric pressure. The chamber which is exposed to atmospheric pressure does not necessarily generate, together with the low pressure which is at the outlet side of the sealing unit, a sufficiently high pressure differential to make reliable sealing of the valve possible.

Another valve for a milk pipeline is known from EP 0 075 255 A1. The valve is configured in the form of a diaphragm valve. The diaphragm is formed by a hose. Inside the hose, a core with a figure-of-eight shaped cross-section is arranged at the level of a control chamber surrounding the hose, against which core the inside wall of the hose lies when the pipeline is sealed. Even with this configuration of the valve, a sufficiently high pressure differential is necessary for secure and reliable sealing thereof. The pressure differential necessary for sealing the valve is in particular dependent upon the material properties of the hose.

Proceeding from the above, an object of the present invention is to further develop the known valve such that the valve can be brought into a sealed position reliably even by means of a slight external over-pressure. A further object of the invention is to configure the valve such that it causes relatively small losses of pressure in the line.

SUMMARY OF THE INVENTION

The above and other objects and advantages of the present invention are achieved by the provision of a valve which comprises an elastic tubular sealing unit having opposite ends which are connected to inlet and outlet connectors in the milk pipeline, respectively. A housing coaxially surrounds the sealing unit so as to form a closed chamber therebetween, and a connection communicates with the closed chamber for admitting a pressure controlling medium. Further, the valve is provided with a structure which engages with at least one section of the sealing unit, and applies a force in the sealing unit directed substantially radially outwardly so that the sealing unit is at least partially deformed and collapsed into a generally oval configuration. With this configuration of the valve, when said valve is non-actuated, that is to say when in both the chamber and in the sealing unit there is atmospheric pressure, the sealing unit undergoes a pre-deformation by means of which a flow cross-section of the sealing unit is narrowed. By means of this pre-deformation the sealed state can be obtained even with a slight external over-pressure, as the natural tension in the sealing unit resisting the deformation is already partially overcome by the forces applied by the engaging structure.

According to an advantageous further development of the valve according to the invention, it is proposed that the engaging structure comprise an elastic sealing body, which is arranged in the sealing unit. The sealing body is thus arranged in the sealing unit such that when the valve is open, it forms, together with a part of the inside curved surface of the sealing unit, two substantially diametrically opposite areas of contact. When the valve is closed, the inside curved surface of the sealing unit lies on the sealing body. The force which leads to a pre-deformation of the sealing unit is applied at least partially by the elastic sealing body. The sealing body is configured such that the circumference of the sealing body corresponds to an inside circumference of the sealing unit with as low a natural tension and as low a rate of wear (free from kinks) as possible, in the area of the sealing unit in which the sealing body is arranged in the sealing unit. In this way, the sealing unit lies on the sealing body with its whole circumference, and together with the sealing body leads to secure sealing of the valve.

According to a further advantageous configuration of the valve, it is proposed that the sealing body is connected to at least one spring element, which exerts a force directed substantially radially outwards upon the sealing body. By means of this advantageous further development of the valve, the force applied by the sealing body, directed radially outwards in the sealing unit is not generated solely by the sealing body but instead also by the at least one spring element. In particular, by means of this configuration, when the sealing body fails, sufficiently high force is still applied in the sealing unit by means of the spring element.

In order to keep the flow resistance of the valve as low as possible, it is proposed that the spring element is configured substantially in a U-shape, and is provided with two legs connected by means of a base, wherein the free ends of the legs are connected to the sealing body. The spring element can be a wire part bent in a U-shape. This configuration is also advantageous in particular with respect to the cleaning of the valve, as by means of the spring element there are substantially no areas of clearance which could, for example, lead to the colonization of bacteria.

As described hereinabove, the sealing body exerts a force directed substantially radially outwardly upon the sealing unit, by means of which the sealing unit is deformed in the non-actuated state. This force is also active when the valve is closed. In order to transfer the valve from a closed state into an open state, the chamber is exposed to low pressure such that when the valve is open, the low pressure prevailing in the chamber acts against a low pressure in the sealing unit and consequently clears the flow cross-section inside the sealing unit. In order to ensure that the sealing unit is widened to the full flow cross-section, according to a further advantageous development of the valve, it is proposed that the valve be provided with an actuating unit which, when the valve is open, exerts a force directed radially inwardly upon the sealing body in at least one area of contact by means of the sealing unit, which forces acts against the force of the sealing body so that the sealing body undergoes a contraction.

According to yet another advantageous configuration of the valve, it is proposed that the sealing body is provided with at least one section lying between the areas of contact, which can be displaced towards the inside curved surface of the sealing unit. This advantageous configuration of the sealing body leads to a reduction in pressure loss inside the valve, as the sealing body is mounted offset from a center of the sealing unit towards the curved surface, and thus does not influence, or influences to only a small extent, the flow inside the sealing unit.

In order that the valve has as few components as possible, whereby the manufacturing of the valve is simplified and the reliability of performance of the valve is increased, it is proposed that the actuating unit is elastically deformable and can be brought into contact with the sealing unit by external pressure. The configuration of the valve is particularly advantageous where the housing is provided with an aperture at least partially overlapping an area of contact, wherein the actuating unit is arranged completely covering the aperture, on the housing. It is proposed in particular that the actuating unit is arranged on the outside curved surface of the housing.

According to a particularly advantageous configuration of the valve according to the invention, it is proposed that the actuating unit is in the form of an elastically deformable sleeve.

According to another advantageous configuration of the valve, it is proposed that the engaging structure be composed of at least one pre-tensioned pull element, which is connected at one end to the outside curved surface of the sealing unit, and at its other end to a holder. By means of this configuration of the valve, the flow cross-section of the sealing unit is free of additional inserted bodies, and as a result, a loss of pressure in the valve can be minimized.

According to a further advantageous configuration of the valve, it is proposed that the pre-tensioning of the pull element be adjustable. In this way, a valve can be adjusted to the low pressure prevailing in a milking machine. Possible appearances of material fatigue in the pull element can also be compensated for by the adjustable pre-tensioning. The pull element can advantageously be moulded onto the outside curved surface of the sealing unit, when the pull element and the sealing unit are composed, for example, from a rubber elastic material. To make the valve easy to mount, it is proposed that the holder can be fixed onto the housing. The holder can also be configured integrally on the housing.

BRIEF DESCRIPTION OF THE DRAWINGS

Further details and advantages of the valve according to the invention will be explained with reference to the embodiments shown in the drawings, in which.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
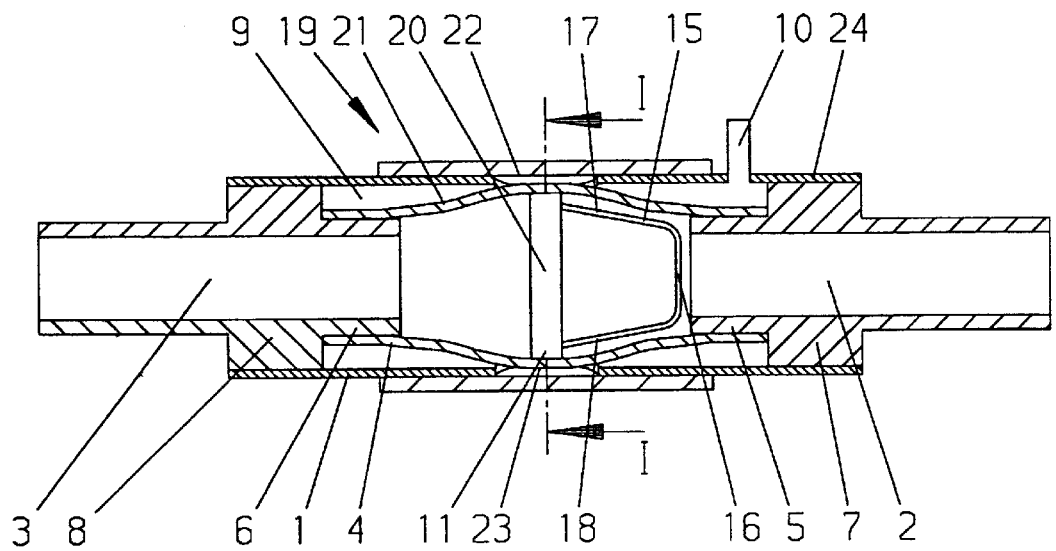
FIG. 1 illustrates a first embodiment of a valve in longitudinal section and in the non-actuated state.

In FIG. 1 a first embodiment of a valve according to the invention is shown in a longitudinal section. The valve is provided with a housing 1 which is configured substantially cylindrically. An inlet pipe connector 2 is connected to the housing 1 via a collar 7. The housing is further connected to an outlet pipe connector 3 by means of a collar B. The inlet pipe connector 2 and the outlet pipe connector 3 are arranged at a distance apart from one another. The end areas of the inlet pipe connector 2 and of the outlet pipe connector 3 facing towards one another form fixing sections 5 and respectively 6. A sealing unit 4 which is configured substantially hose-shaped is connected to the fixing sections 5, 6. A chamber 9 is configured between an outside curved surface 21 of the sealing unit 4 and the housing 1. The chamber 9 is provided with a connection 10. The connection 10 is provided for a working medium.

An elastic sealing body 11 is arranged inside the sealing unit 4. The elastic sealing body 11 is configured substantially web-shaped. The sealing body 11 forms, together with a part of the inside curved surface 12 of the sealing unit 4, two areas of contact 13, 14 lying substantially diametrically opposite one another. A spring element 15 is connected to the sealing body 11. The spring element 15 is configured substantially in a U-shape. It is provided with two legs 17, 18 connected by means of a base 16. The legs 17, 18 are configured in the manner of a spring. In the embodiment shown, the spring element 15 extends with its legs 17, 18 substantially in the longitudinal direction of the sealing unit 4.

The valve according to the invention shown in FIG. 1 is provided with an actuating element 19. The actuating element 19 is arranged in the outside curved surface 24 of the housing, and is configured substantially as a sleeve, which is preferably arranged in a gas-tight manner on the housing 1. The housing 1 is provided with two apertures 22, 23, which are located opposite the areas of contact 13, 14. The cross-section of the apertures 22, 23 is preferably substantially larger than the axial extent of the areas of contact 13, 14. The actuating element 19 completely covers each aperture 22, 23.

Figure 2:
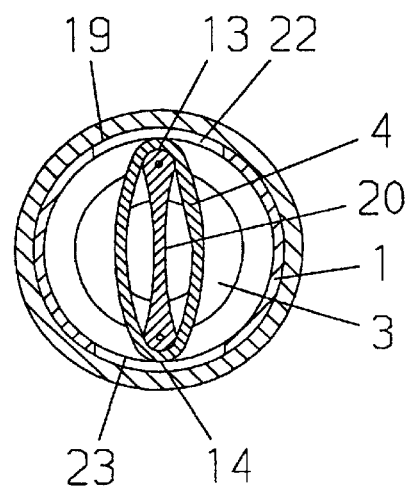
FIG. 2 illustrates the valve according to FIG. 1 in a side view along the section line I—I.

In FIG. 2, the valve 1 is shown in cross-section. The valve is shown in a non-actuated state. The pressure in the sealing unit 4 and in the chamber 9 is the same, so there is no pressure differential. As can be seen from FIG. 2, deformation of the sealing unit 4 is caused by the sealing body 11. The deformation causes the flow cross-section inside the sealing unit to be reduced, preferably substantially reduced. The deformation of the sealing unit 4 is obtained by means of the force effected by the sealing body 11 and the spring element 15. The force acts substantially radially outwardly.

The manner of operation of the first embodiment of a valve according to the invention, shown in FIGS. 1 and 2, will be explained hereinafter with reference to FIGS. 3 and 4.

Figure 3:
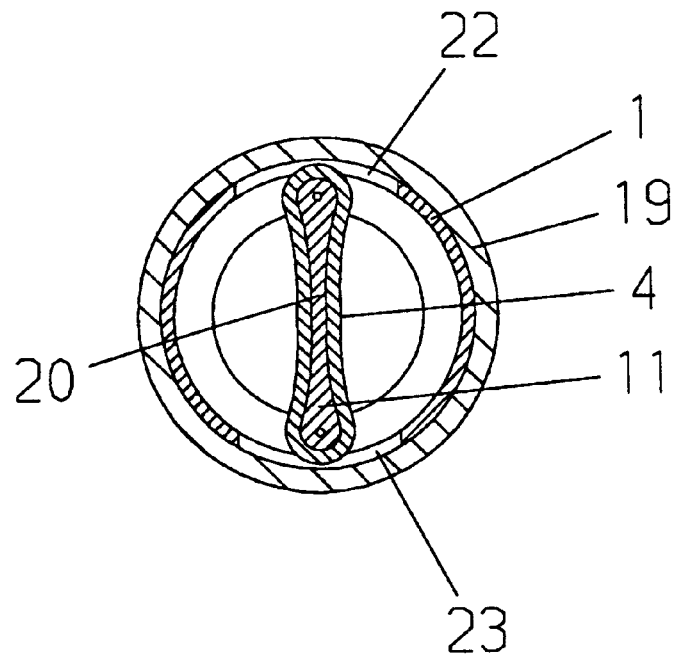
FIG. 3 illustrates the valve in a sealed state and in cross-section.
Figure 4:
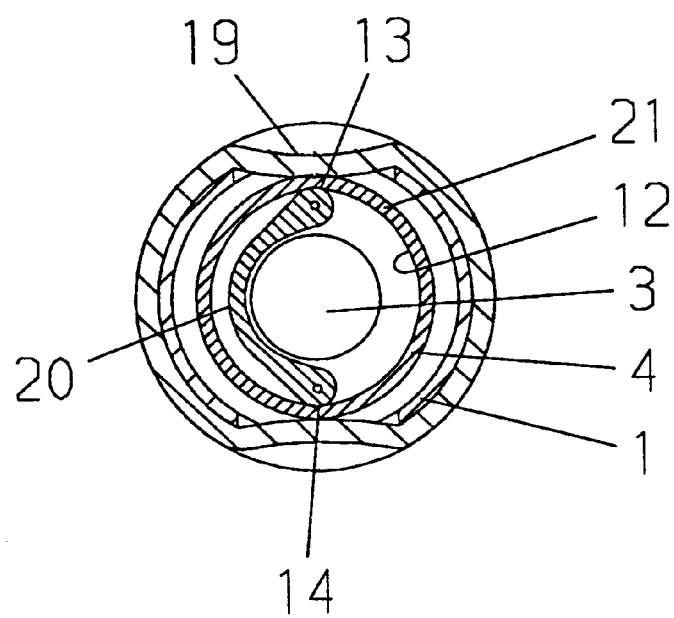
FIG. 4 illustrates the valve according to FIG. 1 in an open state and in cross-section.

In FIG. 3, the valve according to the invention is shown in a sealed position. The valve, which is built into a milk pipeline in which a low pressure, i.e. below atmospheric, prevails, is brought into a sealed position in that the chamber 9 is connected via the connection 10 to the ambient atmosphere. In this way a positive pressure differential exists between the chamber 3 and the sealing unit 4, by means of which the elastic hose-shaped sealing unit 4 is pressed against the sealing body 11.

In the sealed position, the sealing unit 4 lies at least in a liquid-tight manner on the sealing body 11. During the sealing procedure the spring element 15 as well as the elastic sealing body 11 acts further so that the natural tension of the sealing unit 4 is supported by the pressure differential between the chamber 9 and the sealing element 4, and by the sealing element 11 and the spring element 15, so that a reliable sealed position of the valve is obtained as is shown in FIG. 3.

To open the valve, the chamber 9 is exposed to a sufficiently large low pressure whereby at least a pressure equalization between the pressure in the sealing unit 4 and the chamber 9 occurs. Because of the natural tension of the sealing unit 4, this initially returns to a partially deformed state, as is shown in FIG. 2, when the valve is non-actuated.

By means of the low pressure in the chamber 9, a differential pressure occurs between the ambient atmosphere and the chamber 9, by means of which the actuating unit 19 which is configured as a sleeve is partially pressed through the apertures 22, 23 into the chamber 9. The sections of the actuating unit 19 pressed or sucked into the chamber 9 act upon the outside curved surface 21 of the sealing unit 4. The action takes place in the areas of contact 13, 14, 21 opposite the outside curved surface, whereby the sealing body 11 is compressed until the sealing unit 4 assumes its undeformed shape.

As described hereinabove, the sealing body 11 is configured such that it is provided with a section 20 lying between the area of contact 13, 14. The section 20 can be displaced towards the inside curved surface 12 of the sealing unit 4. In the open position of the valve, the section 20 is displaced towards the inside curved surface 12, as is shown in FIG. 4. The displacement is done by the effect of force of the actuating unit 19 upon the outside curved surface 26 of the sealing unit 4.

In this way, a reduction of the pressure loss of the valve is obtained as the sealing body 11 is substantially removed from the flow cross-section and is positioned substantially adjacent to the inside curved surface of the sealing unit 4.

If the sealing unit 4 goes from the open position to the closed position, the chamber 9 is connected to the ambient atmosphere so that a pressure compensation occurs between the chamber 9 and the ambient atmosphere. In this way the actuating unit 19 returns to its original position, whereby the sealing body 11 with its displaced section 20 can also spring back into the original position, as is shown in FIG. 2. The further sealing procedure is implemented as previously described.

Figure 5:
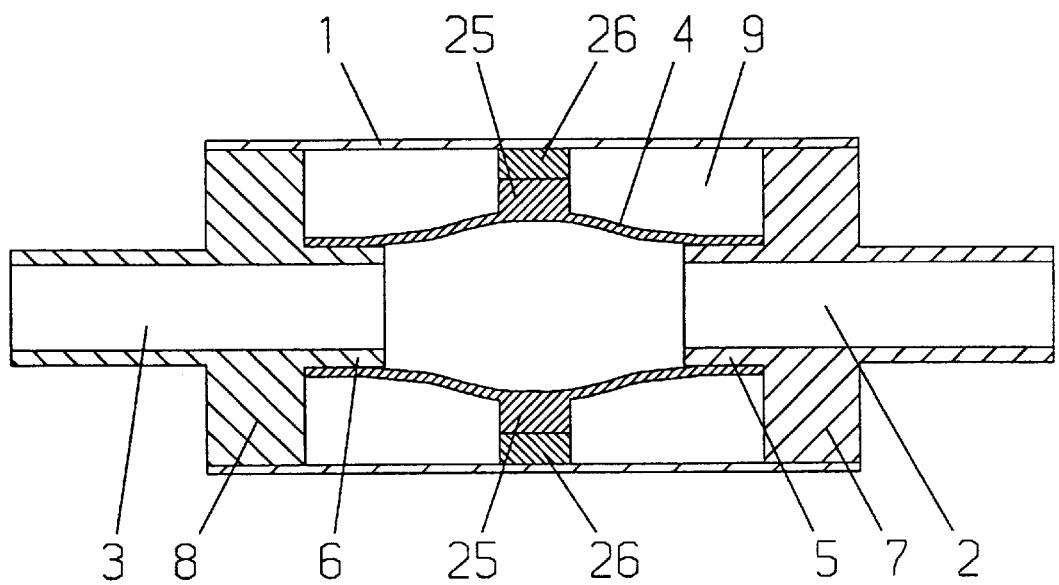
FIG. 5 illustrates a second embodiment of a valve in longitudinal section.
Figure 6:
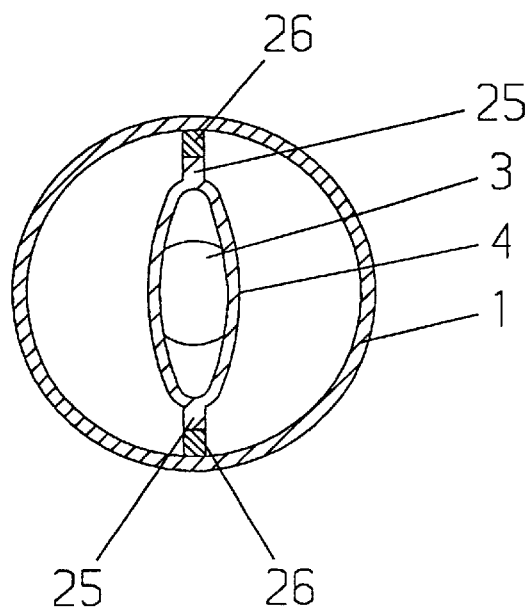
FIG. 6 illustrates the valve according to FIG. 5 in cross-section and in the non-actuated state.

FIGS. 5 and 6 show a second embodiment of a valve according to the invention. The valve differs from the valve shown in FIGS. 1 to 4 in the structure which engages with a least one section of the sealing unit 4, and introduces a force directed substantially radially outwardly in the sealing unit 4. The principal construction of the valve according to FIG. 5 corresponds to the construction of the first embodiment of a valve as shown in FIG. 1.

The sealing unit 4 is provided on the outside curved surface 21 with two pull elements 25 positioned diametrically opposite one another, which elements each exert a pulling force directed radially outwardly upon the sealing unit 4. In the non-actuated state of the valve, the deformation of the sealing unit 4 substantially corresponds to the deformation shown in FIG. 6.

The pull elements 25 may for example comprise a spring or an elastic strip, and each is connected by means of a holder 26 to the housing 1. Also, the tension applied to the sealing unit 4 by each pull element 25 can be adjusted, such as by changing the number of windings if it is a spring, or by changing its length if it is an elastic strip. The advantage of the embodiment of the valve shown in FIGS. 5 and 6 can be seen in that no inserted components are provided in the flow cross-section of the valve.

The valve according to FIG. 5 is brought into a sealed position in that the chamber 9 is connected to the ambient atmosphere. The low pressure prevailing in the valve leads to a deformation of the sealing unit 4, so that the inside curved surface 12 of the sealing unit 4 comes to lie against itself. This deformation of the sealing unit 4 is supported by the pull element 25.

To open the valve according to FIG. 5, the chamber 9 is exposed to low pressure which acts against the low pressure in the sealing unit 4 and the sealing element 4 reverts to a substantially undeformed state.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A valve for controlling the flow of a fluid, such as milk, through a fluid conveying line, comprising
an elastic tubular sealing unit having opposite ends which are adapted to be connected to inlet and outlet connectors respectively,
a housing coaxially surrounding the sealing unit so as to form a closed chamber therebetween, and with a connection communicating with the closed chamber and leading to a controlled outside pressure source,
a structure engaging at least one section of the sealing unit and so as to apply a radially outward force on the sealing unit and deform the sealing unit into a partially collapsed configuration in a non-actuated state,
whereby a positive pressure differential between the pressure within the chamber and the pressure within the sealing unit may be used to fully collapse and thus close the sealing unit.

2. The valve as defined in claim 1 wherein the structure engaging at least one section of the sealing unit is configured to engage two substantially diametrically opposite sections of the sealing unit so as to deform the sealing unit into a generally oval cross-sectional outline.

3. The valve as defined in claim 2 wherein the structure engaging at least one section of the sealing unit comprises an elastic sealing body positioned within the sealing unit, and wherein the sealing unit lies against the sealing body in a closed position of the valve.

4. The valve as defined in claim 3 wherein the structure engaging at least one section of the sealing unit further comprises at least one spring element mounted to exert a force directed substantially radially outwardly upon the sealing body at each of the two opposite sections of the sealing unit which are engaged by the sealing body.

5. The valve as defined in claim 4 wherein the one spring element is U-shaped and is provided with two legs connected to each other via a base, and with the two legs connected to the sealing body.

6. The valve as defined in claim 3 further comprising an actuating element for, when the valve is open, deforming the elastic sealing body toward one side of the sealing unit.

7. The valve as defined in claim 6 wherein the actuating element comprises an elastically deformable sleeve positioned to coaxially surround the housing, and a pair of diametrically opposite openings in the housing which are aligned with the two opposite sections of the sealing unit engaged by the sealing body, such that the sleeve may be moved radially inwardly through the openings and brought into engagement with the sealing unit by oppositely directed external forces.

8. The valve as defined in claim 2 wherein the structure engaging at least one section of the sealing unit comprises a pair of holders connected between the outside surface of the sealing unit and the housing at two diametrically opposite locations on the sealing unit.

9. The valve as defined in claim 8 wherein the pair of holders each include a pull element for applying a tensioning force to the sealing unit.

10. The valve as defined in claim 9 wherein each pull element applies an adjustable tensioning force between the sealing unit and the housing.

11. A milking apparatus comprising
a milk pipeline leading from a milking machine to a teat coupling,
a valve for controlling the flow of the milk through the pipeline and comprising
 (a) an inlet connector and an outlet connector disposed in the milk pipeline,
 (b) an elastic tubular sealing unit having opposite ends, with one of the ends connected to said inlet connector and the other of the ends connected to the outlet connector,
 (c) a housing coaxially surrounding the sealing unit and mounted to each of the inlet connector and the outlet connector so as to form a closed chamber surrounding the sealing unit, and with a connection communicating with the closed chamber and leading to a controlled outside pressure source,
 (d) a structure engaging at least one section of the sealing unit and so as to apply a radially outward force on the sealing unit and deform the sealing unit into a partially collapsed configuration in a non-actuated state,
whereby a positive pressure differential between the pressure within the chamber and the pressure within the sealing unit may be used to fully collapse and thus close the sealing unit.

12. The milking apparatus as defined in claim 11 wherein the structure engaging at least one section of the sealing unit is configured to engage two substantially diametrically opposite sections of the sealing unit so as to deform the sealing unit into a generally oval cross-sectional outline.

13. The milking apparatus as defined in claim 11 wherein the milking machine is constructed to draw a below atmospheric pressure in the milk pipeline, and wherein the controlled outside pressure source is adapted to admit atmospheric pressure into the closed chamber via the connection.

* * * * *